United States Patent
De Chirico

(10) Patent No.: US 12,337,384 B2
(45) Date of Patent: Jun. 24, 2025

(54) METHOD AND SYSTEM FOR ADDITIVE MANUFACTURING

(71) Applicant: Prima Industrie S.p.A., Collegno (IT)

(72) Inventor: Michele De Chirico, Collegno (IT)

(73) Assignee: PRIMA INDUSTRIE S.P.A., Collegno (IT)

( * ) Notice: Subject to any disclaimer, the term of this patent is extended or adjusted under 35 U.S.C. 154(b) by 854 days.

(21) Appl. No.: 17/598,592

(22) PCT Filed: Mar. 20, 2020

(86) PCT No.: PCT/IB2020/052579
§ 371 (c)(1),
(2) Date: Sep. 27, 2021

(87) PCT Pub. No.: WO2020/194149
PCT Pub. Date: Oct. 1, 2020

(65) Prior Publication Data
US 2022/0176452 A1    Jun. 9, 2022

(30) Foreign Application Priority Data
Mar. 28, 2019 (IT) .......................... 102019000004681

(51) Int. Cl.
*B22F 10/28* (2021.01)
*B22F 10/25* (2021.01)
(Continued)

(52) U.S. Cl.
CPC .............. *B22F 10/28* (2021.01); *B22F 10/25* (2021.01); *B22F 10/36* (2021.01); *B22F 10/366* (2021.01);
(Continued)

(58) Field of Classification Search
CPC ......... B33Y 30/00; B33Y 10/00; B33Y 50/02; B33Y 40/00; B33Y 50/00; B22F 12/44;
(Continued)

(56) References Cited

U.S. PATENT DOCUMENTS

2016/0271696 A1    9/2016  Kamakura
2017/0144248 A1    5/2017  Yoshimura et al.
(Continued)

FOREIGN PATENT DOCUMENTS

DE    10 2013 225490    6/2015
DE    10 2017 206843    10/2018
(Continued)

OTHER PUBLICATIONS

Larsson, WO 2004056510 (Year: 2004).*
(Continued)

*Primary Examiner* — Vy T Nguyen
(74) *Attorney, Agent, or Firm* — Nixon & Vanderhye P.C.; Lars H. Genieser

(57) ABSTRACT

A method for additive manufacturing, wherein an additive-manufacturing head (12) is provided, configured both for directing one or more jets of powders, in particular metal powders, onto a region of a working surface (110), and for directing simultaneously a laser beam onto such a region, to form a laser-beam focusing spot (LS) on the region, and wherein, during direction of the powder jets and of the laser beam, the additive-manufacturing head (12) is simultaneously translated in a direction transverse to the direction of the laser beam so as to give rise to a trace (MRP) obtained by melting of the powders as a result of the power transmitted to the powders by the focusing spot (LS). During movement of the additive-manufacturing head (12) in the transverse direction, a dynamic movement is imparted on the laser beam emitted by the head (12), the movement being
(Continued)

configured in such a way as to obtain a width of the trace (MRP) that is independent of the size of the focusing spot (LS) of the laser beam (L) and is equivalent to the one that would be produced by an apparent spot having a width substantially corresponding to the width of the trace (MPP), and in such a way that the distribution of the power transmitted by the laser beam to the trace (MPP) varies along the direction of the width of the trace (MPP).

13 Claims, 6 Drawing Sheets

(51) Int. Cl.
| | | |
|---|---|---|
| *B22F 10/36* | (2021.01) | |
| *B22F 10/366* | (2021.01) | |
| *B22F 10/85* | (2021.01) | |
| *B22F 12/41* | (2021.01) | |
| *B22F 12/46* | (2021.01) | |
| *B22F 12/53* | (2021.01) | |
| *B22F 12/55* | (2021.01) | |
| *B23K 26/08* | (2014.01) | |
| *B23K 26/082* | (2014.01) | |
| *B23K 26/144* | (2014.01) | |
| *B23K 26/342* | (2014.01) | |
| *B33Y 10/00* | (2015.01) | |
| *B33Y 30/00* | (2015.01) | |
| *B33Y 50/02* | (2015.01) | |

(52) U.S. Cl.
CPC .............. *B22F 10/85* (2021.01); *B22F 12/41* (2021.01); *B22F 12/46* (2021.01); *B22F 12/53* (2021.01); *B22F 12/55* (2021.01); *B23K 26/082* (2015.10); *B23K 26/342* (2015.10); *B33Y 10/00* (2014.12); *B33Y 30/00* (2014.12); *B33Y 50/02* (2014.12); *B23K 26/0869* (2013.01); *B23K 26/144* (2015.10)

(58) Field of Classification Search
CPC .......... B22F 12/49; B22F 12/53; B22F 10/25; B22F 10/85; B22F 12/90; B22F 10/28; B22F 10/366; B22F 12/226; B22F 12/70; B22F 10/364; B22F 10/50; B22F 12/41; B22F 12/46; B22F 10/36; B22F 12/00; B22F 12/33; B22F 12/45; B22F 12/86; B22F 7/02; B22F 10/20; B22F 10/362; B22F 10/38; B22F 10/73; B22F 12/13; B22F 12/22; B22F 12/55; B22F 2003/247; B22F 3/105; B23K 26/082; B23K 26/342; B23K 26/0006; B23K 26/0643; B23K 26/0093; B23K 26/032; B23K 26/034; B23K 26/0608; B23K 26/064; B23K 26/0665; B23K 26/073; B23K 26/0736; B23K 26/123; B23K 26/142; B23K 26/144; B23K 26/147; B23K 26/1476; B23K 26/1482; B23K 26/352; B23K 26/354; B23K 26/702; B23K 26/703; B23K 37/04
USPC ......... 219/76.12; 264/40.1, 434, 497; 419/1, 419/61; 65/17.3
See application file for complete search history.

(56) References Cited

U.S. PATENT DOCUMENTS

| | | | |
|---|---|---|---|
| 2017/0190113 A1* | 7/2017 | Calefati | B22F 12/13 |
| 2018/0154443 A1* | 6/2018 | Milshtein | B22F 12/41 |
| 2018/0345413 A1* | 12/2018 | Wuest | B33Y 30/00 |
| 2019/0009369 A1 | 1/2019 | Vorontsov | |

FOREIGN PATENT DOCUMENTS

| | | |
|---|---|---|
| EP | 1 583 626 | 10/2005 |
| JP | 2015-196265 A | 11/2015 |
| JP | 2017-524827 A | 8/2017 |
| WO | 2015/181772 A1 | 12/2015 |

OTHER PUBLICATIONS

International Search Report and Written Opinion of the ISA for PCT/IB2020/052579, mailed Jun. 25, 2020, 13 pages.
Office Action dated Nov. 21, 2023, issued in Japan Patent Application No. 2021-547262, 4 pages.

* cited by examiner

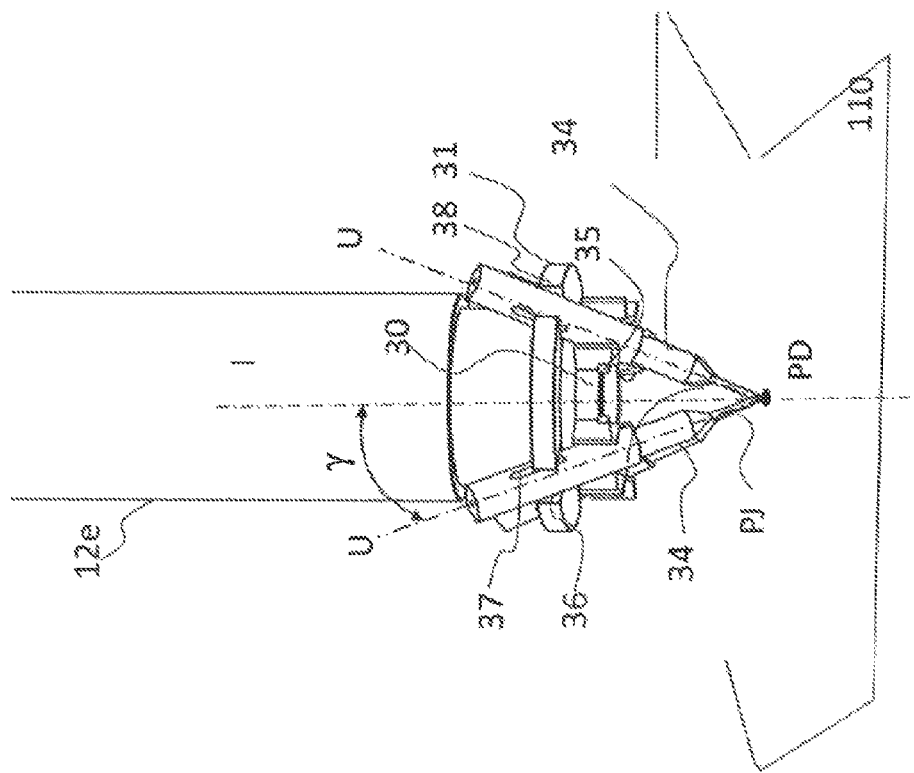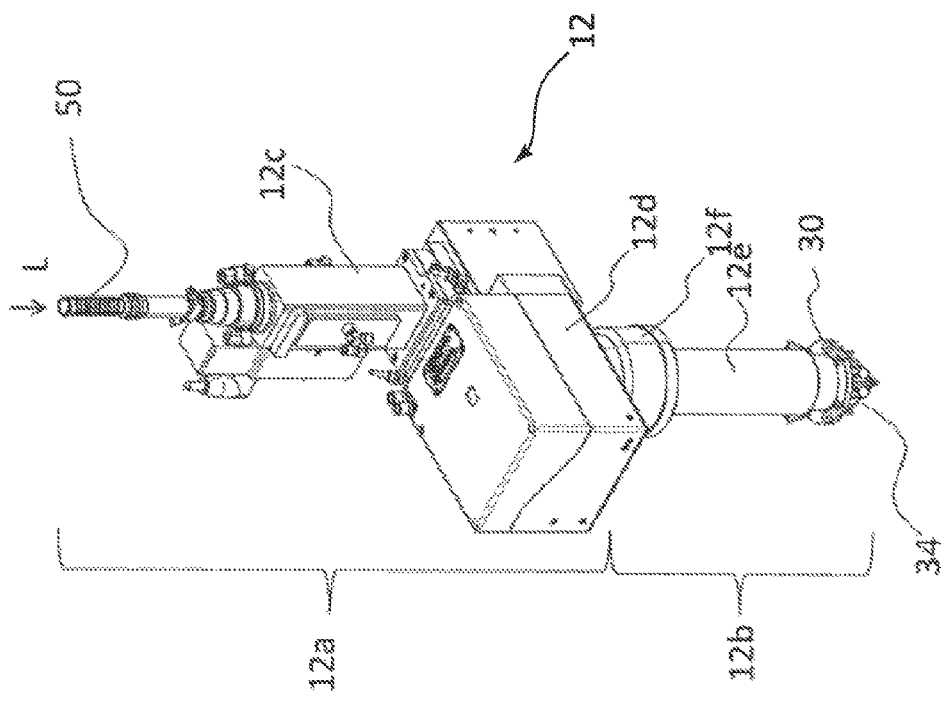

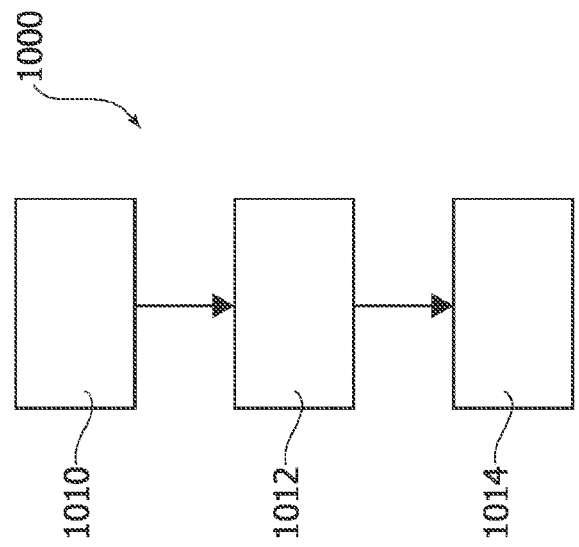
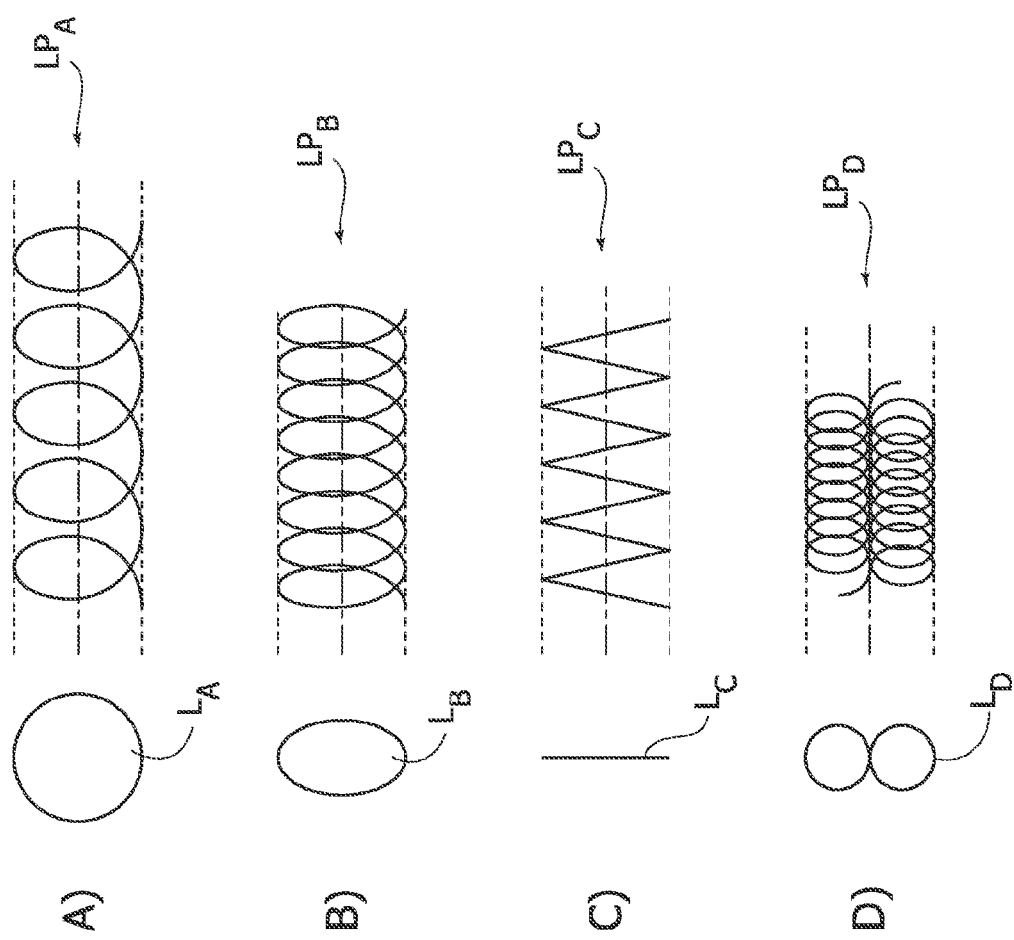

METHOD AND SYSTEM FOR ADDITIVE MANUFACTURING

This application is the U.S. national phase of International Application No. PCT/IB2020/052579 filed 20 Mar. 2020, which designated the U.S. and claims priority to IT patent application No. 102019000004681 filed 28 Mar. 2019, the entire contents of each of which are hereby incorporated by reference.

FIELD OF THE INVENTION

The present invention relates to a method and a system for additive manufacturing. In particular, the invention relates to a method for additive manufacturing of the type where an additive-manufacturing head directs one or more jets of powders, in particular metal powders, onto a region of a working surface, where such a head simultaneously directs a laser beam onto such a region to form a laser-beam focusing spot on such a region, and where, during direction of such powder jets and of such a laser beam onto such a region, such an additive-manufacturing head is simultaneously translated in a direction transverse to the direction of the laser beam so as to give rise to a trace obtained by means of melting of such powders as a result of the power transmitted to such powders by such a focusing spot.

PRIOR ART

A system for additive manufacturing of the type referred to above is discussed in the document WO 2018/069809 A1 filed in the name of the present applicant.

A system for additive manufacturing of this sort may be referred to as "directed energy deposition" (DED).

As mentioned in the foregoing, DED systems may comprise a head suitable for:
- depositing material, for example jets of powders, in particular metal powders obtained from one or more metal materials, on a working area; and
- simultaneously with deposition, thermally treating the above powders via a beam of focused thermal energy, namely, a source of energy (e.g., a laser beam, an electron beam, or a plasma arc) focused so as to melt the materials that are being deposited.

The powders can be deposited on the working area via nozzles configured for emitting powder jets, for example nozzles that are secured or movable with respect to the head. These powders, once deposited, tend to assume a certain spatial distribution over the working region or surface, for example forming a sort of bell (or portion of cylinder) of powders on a working surface. The bell has a density that has a maximum value in a central area, starting from which it has a value that decreases in a way proportional to the radial distance from the central area.

During the simultaneous thermal treatment of the powders, a laser beam is driven so that a spot thereof will come to be superposed upon the bell-shaped spatial distribution of the powders. By "laser spot" is meant the area of the normal section of the laser beam itself on the working surface.

Such a, total or partial, superposition causes a certain amount of powder to be intercepted by the laser spot and hence be melted by the power transmitted by the laser beam. Such an amount of material intercepted by the laser spot, referred to as "melt pool", once cooled and solidified, forms a raised area of solid material, for example metal.

By translating the head in one direction over the working surface, namely, by simultaneously moving the laser beam and the powder jet, the sequence of pools molten and solidified is going to form a trace extending in the direction of translation of the head, for example in the longitudinal direction x on the working surface. This trace comprising the sequence of melt pools has, for example, in a cross-sectional view in a direction y transverse to the longitudinal direction x, a width and a depth.

Specifically, the width of the melt pool is determined mainly by the size of the laser spot, for example by the width of the laser spot that comes to be superimposed on the deposited powders, and secondarily by the density of energy of the spot. The width of the laser spot hence determines the geometry of a "trace" or "elementary production block" for obtaining any object via DED.

In fact, to obtain an object via DED additive manufacturing, the additive-manufacturing head is driven to move along predefined paths, prearranged to obtain sections of an object. Adjacent traces of material make up a single layer in a set of layers that, formed on top of one another, constitute a three-dimensional object that is to be produced. For instance, in order to obtain a cylindrical tube, the head can be driven to follow a circular path and driven so that it displaces in a vertical direction z upon completion of each circumference in order to obtain a cylinder in an additive way.

The characteristics of the object produced according to this technology of additive manufacturing by directed energy deposition are dependent upon and a function of the characteristics (or parameters, properties) of the trace, that comprises one or more sequences of melt pools.

In particular, the width and depth of the trace are figures of merit, where by "depth" is meant a maximum thickness of the melt pool in the vertical direction z.

FIGS. 1A and 1B of the annexed drawings provide examples of these characteristics of the melt pool and of the profile of the laser beam that determines it. Specifically, FIGS. 1A and 1B each represent:
- in the top part, a graph of the radial distribution of power transmitted by the laser to the powders, where the abscissae represent a radial direction r, for example expressed in metres (m), and the ordinates represent a power P, for example expressed in watts (W); and
- in the bottom part, a section MP, in a direction transverse to the longitudinal direction of extension of the trace, of a trace resulting from transmission of the distribution of power in the corresponding top part.

It is noted that the images are provided merely by way of example and are not exactly in scale.

Appearing in FIG. 1A and designated by G is a first set of radial profiles, for example having a quasi-Gaussian distribution, of the power transmitted by the laser beam used for thermal treatment of the powders. It is noted that the section of the trace MP in the same FIG. 1A may correspond to a section of a melt pool obtained via treatment of metal powders deposited together with application of the quasi-Gaussian distribution of power. For instance, a trace MP of a certain width can be obtained by application of one of the quasi-Gaussian power-distribution profiles G via thermal conduction of such a transmitted power in the material itself.

Analysing a distribution of density of the powders in a section transverse to the powder jet at output from the nozzles, it may be noted that this density distribution of the powders typically has a bell-shaped profile in a cross section containing the radial direction r. Consequently, the trace MP obtained by application of the laser beam G has a depth that varies as a function of the distance from a centre along a radial axis r, for example a thickness having a maximum value q at the centre and a minimum value tending to zero at the edges, where the edges are located at a distance a from one another, where, for example, a is the distance between the minima of the power distribution G of the laser beam.

Likewise, in the top part of FIG. 1B is represented a second set of profiles of transmitted power of the laser beam of the type, for example, having a top-hat distribution designated by T, which may give rise to a section MP' of the trace (and of the corresponding melt pool) that has a depth that ranges between a thickness having a maximum value q' at the centre and a thickness having a minimum value tending to zero at the edges, where the edges are located at a distance b equal to the distance between the minima of the power of the laser beam. In the example considered, the value b is greater than the value a insofar as a profile T of a top-hat laser spot is typically more extensive than a profile G of a quasi-Gaussian spot. For instance, a trace MP' of a certain width can be obtained by application of one of the top-hat power-distribution profiles T via thermal conduction, in the material itself, of the transmitted power.

By translating a head equipped for emitting a laser beam having a power distribution G, as exemplified in FIG. 1A, it is thus possible to obtain a relatively "thin" trace (namely, for example, of a thickness q that is small as compared to the thickness q' obtained in the case of the top-hat beam T) that makes it possible to have a good surface quality of the product (in so far as a thinner trace facilitates an increased degree of resolution), in spite of a lower productivity, namely, of a longer production time (in so far as the trace of FIG. 1A is relatively thinner, as compared to that of FIG. 1B, and hence requires an increased number of "times" to obtain an object having a given configuration and given dimensions).

Instead, by translating a head configured for emitting a laser beam having a top-hat power distribution, for example as exemplified in FIG. 1B, it is possible to obtain a second type of trace characterized by a large amount of material deposited in the melt pool, thus increasing productivity, but losing in terms of resolution. By the term "resolution" is meant the capacity to obtain details of an object to be produced.

The increased width b of the trace obtained with a top-hat distribution of laser power also leads to an increased thickness q' thereof as a result of the bell-shaped spatial distribution of the powders.

DED additive-manufacturing systems hence present the problem, namely the challenge, of reaching high productivity, understood as capacity of obtaining a desired product in as short a time as possible, without jeopardizing the precision and quality of the finished product. In fact, if a head operates with a certain power distribution of the laser beam, it can produce objects using a certain type of trace. To obtain traces with different characteristics, it is possible to use a number of heads, for example by substituting with one another during processing a head configured for emitting a quasi-Gaussian beam and a head configured for emitting a top-hat beam or else by using both one type of head and another type of head. These solutions involve, however, a considerable increase in production times, costs, and the complexity of the system (as well as complexity of pre-arrangement of the commands with which to drive the system to obtain the desired object).

A further drawback of a solution that uses two heads, either in substitution of one another or operating in parallel, derives from the fact that an object obtained with traces having different thicknesses (for example, q, q') set alongside and on top of one another favours increase of porosity of the object obtained since it is easier for gaps to remain in the object, for example gaps of a size given by the difference between the different thicknesses q', q.

Also known are solutions that make use of an adaptive collimator that makes it possible to vary the diameter of the laser spot. These solutions present, however, the drawback of not allowing a variation of the energy distribution, which consequently remains always of the type presenting a central peak.

OBJECT OF THE INVENTION

The object of the embodiments described herein is to improve the methods and systems according to the prior art, as discussed in the foregoing.

In particular, an object of the invention is a method and a system for directed-energy-deposition additive manufacturing that facilitates a high productivity, understood as capacity of obtaining a desired product in a time that is as short as possible, at the same time facilitating a high precision and quality of the finished product.

Once again, a further object of the invention is to obtain such purposes using relatively simple and low-cost means, likewise simplifying the complexity of pre-arrangement of the commands with which to drive the system to produce the object itself.

SUMMARY OF THE INVENTION

Various embodiments achieve one or more of the objects in the foregoing thanks to a method for additive manufacturing and to a corresponding system for additive manufacturing, having the characteristics set forth in the claims that follow. The claims form an integral part of the technical teachings provided herein in relation to the invention.

In particular, the object of the solution as per the present disclosure is a method having the characteristics referred to at the beginning of this description and moreover characterized in that, during translation of the additive-manufacturing head in such a transverse direction, a dynamic movement is imparted, with respect to the head, on the laser beam emitted by the head, such a dynamic movement being configured in such a way as to obtain a width of the metal trace that is independent of the size of the focusing spot of the laser beam and is similar, namely substantially equivalent, to the one that would be produced by simple translation of an apparent spot having a width corresponding to the width of the trace, such a dynamic movement being moreover configured in such a way that the distribution of the power transmitted by the laser beam to the trace varies along the direction of the width of the trace.

In this way, the dynamic movement imparted on the laser beam (which is here to be understood as movement imparted to the direction of emission of the laser beam) causes the working surface to be illuminated by a "profile" or "apparent spot" of the laser beam, where the geometry of this shape profile is determined by the pattern resulting from the dynamic movement imparted on the laser beam with respect to the head. Consequently, the properties of the trace obtained by melting of the powders deposited on the working surface are determined via a distribution of power transmitted by the profile that illuminates the working region onto the powders deposited therein.

Thanks to such characteristics it is possible to obtain a relatively wide and thin metal trace, namely, one in which the depth and the width can be varied in a way decoupled from one another. Such a possibility of the process on the one hand facilitates obtaining a given product in a relatively short time (insofar as with a wider trace the number of traces mandatory is decreased) and on the other hand makes it possible to produce the product by overlaying layers of (decreased) depth and hence with a high degree of resolution.

Various embodiments achieve one or more of the aforesaid objects thanks to a method for additive manufacturing, where a cyclic movement (for example, of rotation, translation, or rototranslation) is imparted on the laser beam so that in each cycle the focusing spot of the laser beam describes a pre-set pattern.

In various embodiments, a movement of dynamic oscillation $\omega$ is in particular imparted on the laser beam.

In the present description and in the ensuing claims, the term "dynamic oscillation" is used to indicate a cyclic, continuous, or even intermittent oscillation that is variable in time with a pre-set frequency, which leads the focusing spot to follow a pre-set pattern in a cyclic and periodic way.

According to a preferred embodiment, the oscillation imparted on the laser beam is pre-set in such a way that a central area of the trace receives from the laser beam a lower power than do lateral areas of the trace so as to obtain a trace that has a pre-set and controlled depth in the direction of the width of the trace and is relatively small as compared to the width, notwithstanding the tendency of the powders to accumulate to a higher level in the central area of the trace.

In this way, it is thus possible to select geometries of the laser spot that result from such a movement such as to make it possible to operate in a flexible way during the processing cycle, whether with a high resolution and a low productivity, or with a low resolution and a high productivity, or again with a high resolution and a high productivity.

In a preferred example, moreover, a movement of cyclic oscillation is imparted on the laser beam, substantially corresponding to a movement of precession, where in each cycle of such a movement of precession the focusing spot of the laser beam describes the pre-set pattern, for example chosen from among a circular pattern, an elliptical pattern, a linear pattern, and a pattern shaped like a FIG. 8. It is noted that the above list of patterns is presented purely by way of example in so far as the solution discussed herein teaches how to use any further pattern suited for imparting a dynamic movement to obtain a width of the trace equivalent to the one that would be produced by an apparent spot having a width substantially corresponding to the width of the trace so that the depth and the width of the trace obtained can be decoupled.

In one or more embodiments, the velocity of translation of the additive-manufacturing head and the velocity with which the focusing spot of the laser beam describes such a pattern at each cycle of movement of the laser beam are predetermined in such a way as to obtain a desired distribution of the power transmitted by the laser beam to the trace in the direction of the width of the trace. Specifically, this pattern, the velocity of translation of the head, and/or the velocity at which the focusing spot of the laser beam describes such a pattern at each cycle of movement of the laser beam are chosen in such a way as to give rise to a profile of the power transmitted by the laser beam, with respect to the direction of the width of the trace, that has a central valley and at least two symmetrical peaks at the two sides of the central valley, so that the metal trace obtained can have a pre-set and controlled depth, notwithstanding the tendency of the powders to accumulate to a higher level in the central area of the trace, the depth of the trace being also consequently decreased with respect to the depth that it would have following upon such an accumulation of powders.

For instance, the trace obtained may have a shape that is more flattened at the centre as compared to what can be obtained with known solutions and that presents a small difference in level between the point of maximum thickness and the point of minimum thickness of the trace, notwithstanding the tendency of the powders to accumulate to a higher level in the central area of the trace, the depth of the trace being also consequently decreased with respect to the depth that it would have following upon such an accumulation of powders.

Advantageously, according to embodiments, there is the possibility of modulating and controlling the shapes of the laser beam so as to facilitate a management of the properties of the melt pool that is continuous (and not just discrete between the Gaussian shape and the top-hat shape). This makes it possible, for example, to obtain the outside of the piece with narrower traces—so as to have a better resolution and hence a better precision and surface finish—and the inner part with wider traces, having the same depth, without creating gaps that would increase the porosity of the object obtained.

Various embodiments achieve one or more of the aforesaid objects thanks to a system for additive manufacturing comprising an additive-manufacturing head including one or more nozzles for directing one or more jets of metal powders onto a region of a working surface, and a laser-beam focusing and directing device for directing a laser beam onto such a region simultaneously with direction of such jets of metal powders, to form a focusing spot of the laser beam on such a region, and wherein such an additive-manufacturing head is configured for being translated in a direction transverse to the direction of emission of the laser beam, during direction of such jets of metal powders and of such a laser beam, such a head further comprising a device for orienting the laser beam emitted, and at least one electronic controller for controlling the movement of translation of the head and for governing such a laser-beam orienting device.

At least one electronic controller is hence configured for governing such a laser-beam orienting device in order to impart on the laser beam emitted by the head, during movement of the head in such a transverse direction, a dynamic movement configured in such a way as to obtain a width of the trace that is independent of the size of the focusing spot of the laser beam and is equivalent to the one that would be produced by an apparent spot having a width substantially corresponding to the width of the trace and in such a way that the distribution of the power transmitted by the laser beam to the trace varies along the direction of the width of the trace.

In various embodiments, for example, such a laser-beam orienting device comprises a pair of mirrors arranged in sequence along the path of the laser beam and mounted oscillating about respective mutually orthogonal axes, and two actuator devices, each for governing a movement of oscillation of a respective mirror.

In various embodiments, for example, the laser-beam orienting device may comprise a plurality of optical components, preferably including rotating prisms and/or adaptive collimators.

In various embodiments, one or more nozzles may be orientable via respective actuators.

Once again, advantageously, such a possibility of modifying in a continuous way the properties of the trace may simplify a step, prior to design, of provision of the paths along which to translate the head, for example a CAM programming step. For instance, it is possible to define properties of each layer of an object, maintaining always the same depths and proportions in the traces with which the layers themselves are formed.

BRIEF DESCRIPTION OF THE DRAWINGS

Further characteristics and advantages of the technical solution as per the present disclosure will emerge from the ensuing description with reference to the annexed drawings, which are provided purely by way of non-limiting example and in which:

FIG. 3 is a view of a head of an additive-manufacturing system;

FIG. 3A shows a detail of the head at an enlarged scale;

FIGS. 6 to 8 represent exemplary diagrams related to details of the structure and operation of a system according to the present solution; and FIG. 9 represents an exemplary diagram of operations of a method according to the present description.

DETAILED DESCRIPTION OF AN EMBODIMENT

In the ensuing description, numerous specific details are presented in order to enable maximum understanding of the embodiments provided by way of example. The embodiments may be implemented with or without specific details, or else with other methods, components, materials, etc. In other circumstances, structures, materials, or operations that are well known are not illustrated or described in detail so that aspects of the embodiments will not be obscured. Reference, in the course of the present description, to "an embodiment" or "one embodiment" means that a particular peculiarity, structure, or characteristic described in connection with the embodiment is comprised in at least one embodiment. Hence, phrases such as "in an embodiment" or "in one embodiment" that may be present in various points of the present description do not necessarily refer to one and the same embodiment. In addition, particular peculiarities or structures or characteristics may be combined in any convenient way in one or more embodiments.

The letters and references used herein are provided merely for convenience of the reader and do not define the scope or the meaning of the embodiments.

Figure 1A:
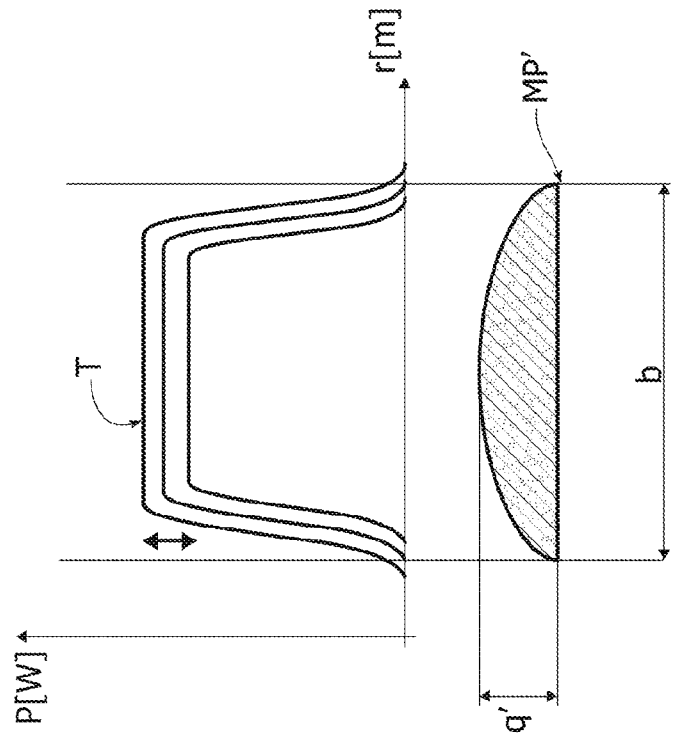
FIGS. 1A and 1B are diagrams (discussed in the foregoing) representing two different laser beams and the corresponding traces, which can be obtained with methods according to the prior art.
Figure 1B:
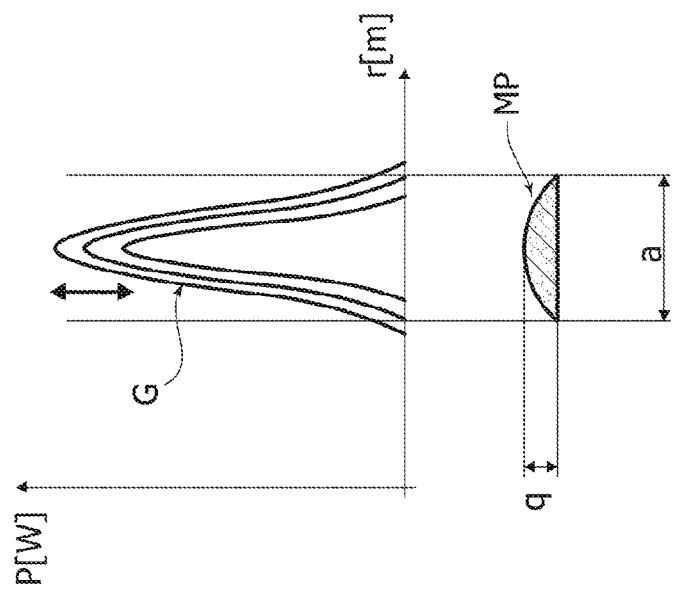
Figure 2:
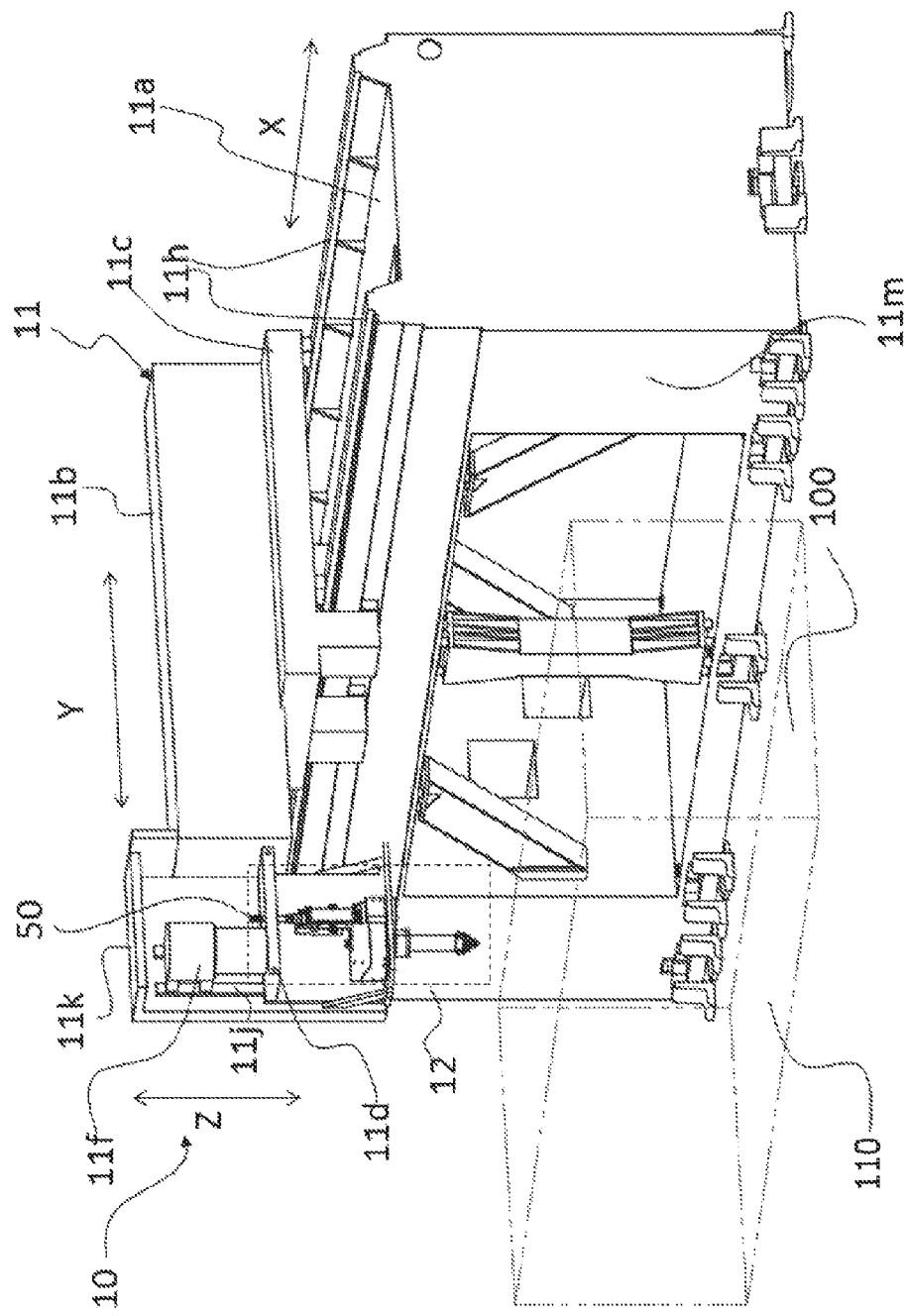
FIG. 2 is a view of an additive-manufacturing system.

With initial reference to FIGS. 2 and 3, designated as a whole by 12 is a head or moving element comprising an optical unit (or optical head) of a machine 10 for directed-energy-deposition (DED) additive manufacturing according to the present description.

It is noted that the machine described hereinafter constitutes merely an example of machine implementation to which the following solution may be applied. A machine of this sort is illustrated in the document WO 2018/069809 A1 filed in the name of the same Applicant. It is however understood that the solution described herein is of altogether general application given that it can be implemented also on machines having any other configuration and arrangement, different from the one illustrated herein by way of example.

With reference to the example illustrated, a DED additive-manufacturing machine may comprise a Cartesian machine 10, for example with redundant axes, comprising one or more arms configured for displacing the head 12 via actuators driven by a control unit.

Following, FIG. 2 is a schematic perspective view of an embodiment of the DED additive-manufacturing machine, designated as a whole by the reference number 10, which comprises a conveying structure 11, designed to displace a support 11d, securely associated to which is a head or moving element 12 for additive manufacturing by direct deposition of powders, along a first plurality of axes, specifically three Cartesian axes X, Y, Z.

For this purpose, the conveying structure 11 comprises a guide structure 11a, which includes a base 11m and, on the top part, rails 11h that extend along the horizontal axis X. Positioned on the rails 11h is a slide 11c free to slide along the extension of the rails 11h. Resting on this slide 11c is an end of a cantilever beam 11b, which extends in a direction orthogonal to the direction of extension of the rails 11h, for example along the axis Y orthogonal to the axis X. Such an end of the cantilever beam 11b is slidingly associated to the slide 11c, on which it rests. The other free end of the beam 11b has a support 11k with vertical guides 11j, via which the support 11d, which carries the head 12, is guided along a vertical axis, for example an axis Z orthogonal to the plane XY. The movements of the support 11d along the axis Z are governed by a motor 11f.

The movements of the beam 11b with respect to the slide 11c and of the slide 11c with respect to the guide structure 11a are also driven by motors, which are not, however, visible in FIG. 2.

As a result of this configuration, displacement of the head 12 takes place in a working volume 100, namely, basically in a parallelepiped, the dimensions of which are defined by the travel of the head 12 along the horizontal axes X and Y, and the vertical axis Z.

One face of the parallelepiped 100 that forms the working volume (for example, the bottom face) is the working surface 110, starting from which, as described in what follows, the sections of an object to be produced by additive manufacturing are thermally treated at high temperatures (for example, they undergo melting).

In variant embodiments, the working surface 110 may be understood as the surface, for example, of a substrate (or of a bench on which a substrate is present), on which the powders are deposited and melting thereof is carried out, or else also an element on which a structure is grown in an additive way via the process described herein. Consequently, in general, by "working surface" is meant the surface at the level (for example, along the axis Z) at which the process is carried out.

Alternatively, the conveying structure 11 maybe, for example, of the portal type.

The structure of the head 12 described in what follows, is also in itself known from the document WO 2018/069809 A1 filed in the name of the present applicant. Once again, this structure is illustrated herein purely by way of example. It is understood that the solution would be applicable also to different head structures, compatibly with the possibility of implementing the principles that underlie the present solution, as emerging clearly from the ensuing description.

In the example, the head 12, as more fully illustrated in what follows, comprises nozzles 34 for emitting or injecting powder jets and an optical unit for simultaneously directing a laser beam for thermally treating such powders. The machine 10 comprises, for example, a catenary, not visible in FIGS. 2 and 3, which includes optical-fibre cables that connect up via a cabling 50 of the head 12 so as to convey the radiation originating from a source of laser radiation, for example located remotely with respect to the head 12, in the laser optical unit of the head 12. The laser optical unit comprises a collimation device 12c (for example, adaptive or stable collimation) and an optical device 12d for orientation (or deflection) of the laser beam.

By "optical device" is in general meant a system configured for varying the optical properties of a laser beam, for example an optical deflection apparatus that may comprise a scanner, or piezoelectric actuators, or one or more prisms, or further optical elements configured for varying an optical path of a laser beam in a controlled way.

In various embodiments, the head 12 may include the laser source itself.

The above catenary may possibly deliver also process gases, such as argon or nitrogen, for the melting process. Once again, in the example considered, the above catenary comprises conduits for delivering the melting powders from respective supply devices arranged remotely with respect to the machine 10. Moreover, the above catenary comprises electrical control cables and possible tubes for delivering coolant.

FIG. 3 represents the head 12 in perspective view. The head 12 comprises a top portion 12a, which substantially houses the laser optical unit 12d. Connected, in fact, to the top portion 12a is the cabling 50, which, as has been mentioned, comprises inside it an optical fibre that carries a laser beam L emitted by a laser source located remotely and hence not illustrated in FIGS. 2 and 3.

The cabling 50 enters a first boxlike body 12c in the top portion 12a, which is located on the top wall of a second boxlike body 12d.

Such a first boxlike body 12c, as is more clearly visible in FIG. 3, houses inside it an adaptive-collimation device, which receives the laser beam L along an axis parallel to the vertical axis Z.

Figure 6:
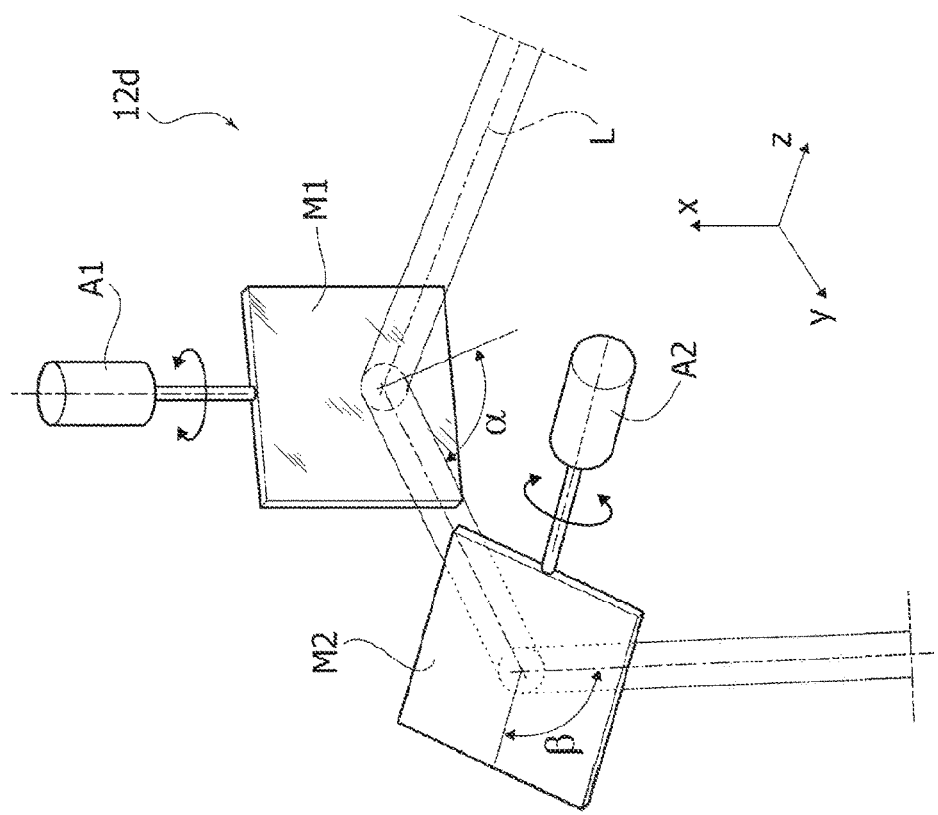

The second boxlike body 12d houses inside it the optical device, for example comprising optical scanning means that direct the laser beam, as discussed in what follows (in particular, with reference to FIG. 6).

The head 12 further comprises, in addition to the top portion 12a, also a bottom portion 12b, set underneath the top portion 12a and associated thereto, via a top wall of its own, associated to a bottom wall of the second boxlike body 12d that houses the optical scanning means.

Such a bottom portion 12b comprises a through conduit 12e, the main axis of which is parallel to the vertical axis Z, but staggered in the horizontal plane XY with respect to the axis of the adaptive-collimation device 12c. The through conduit (or spacer) 12e, which is preferably pressurized, has a tubular shape and is associated to the boxlike body 12b via an open end of its own and via a rotary-actuation system 12f, associated to actuation motors (not visible in the figure), which facilitates rotation of the through conduit 12e about its own main axis.

In the example discussed here, the top portion 12a is represented as having a size greater than the corresponding size of the bottom portion 12b. The ratio between the sizes is provided merely by way of example, it remaining on the other hand understood that in one or more embodiments the ratios of these sizes may be different and even reversed with respect to what is exemplified in FIGS. 2, 3, and 3A. Specifically, the bottom portion may be appreciably shorter than the top portion.

The other open end of the through conduit 12e is open at least from an optical standpoint insofar as, in order to maintain pressurization, there may be provided a sealing element transparent to the wavelength of the laser radiation. Such another open end is set facing the working area 100 and is connected in a secured way to an end effector comprising a tool-holder frame 30 on which a plurality of nozzles 34 are mounted for emission/injection of powder jets PJ. Such a tool-holder frame 30 is securely associated to such an open end of the through conduit 12e.

With reference to FIG. 3A, this shows a view at an enlarged scale of the terminal part of the conduit 12e and of the tool-holder frame 30 of the head 12.

In the example considered, the above frame 30 is shaped like an annulus, so that it defines a perimeter that is accordingly in the form of a circumference that identifies a circular area of passage inside it. In the example described herein, the nozzles 34 secured with respect to the frame 30 are four in number in two diametrally opposite pairs of points and at an angle of 90° between one another along the circumference of the frame 30.

It is noted that the number of four nozzles described here is provided merely by way of example. Any number of nozzles may be present in other embodiments.

In the example discussed, the tool-holder frame 30 is positioned parallel to the working surface 110; namely, its perimeter and its area are parallel to the plane XY. The nozzles 34 are preferably arranged so as to have respective nozzle-emission axes U inclined towards an injection axis I passing through the centre of the perimeter of the frame 30, to form, that is, an acute angle of inclination with the injection axis I itself. Consequently, these nozzle axes U intersect at a powder-deposition point PD.

According to a preferred embodiment, one or more of the above nozzles 34 is a nozzle for spraying process gas.

According to another preferred embodiment, one or more of the above nozzles 34 is a nozzle for spraying powders to be melted, surrounded by a protective gas.

The second boxlike body 12d comprises, inside it, the optical unit that conveys laser radiation L and focuses it in a laser spot LS in the working volume 100. This laser radiation L comes from the collimation element 12c that facilitates variation of the diameter and the focusing point of such a laser spot LS starting from a laser radiation, with characteristics of power suitable for melting, conveyed by a remote laser source through the optical fibre in the cabling 50, or alternatively, via an optical chain or a source of laser radiation, which is also located in the head 12.

Downstream of the adaptive collimator 12c, along a vertical axis of propagation of the laser radiation L, a stationary mirror (not visible in the figures) deflects the laser radiation L perpendicularly, namely, in a horizontal direction. This mirror preferably has characteristics of selection in frequency (namely, it is, for example, a dichroic mirror) so as to carry out monitoring of the non-reflected radiation coming from the source or from the processing area 110. In particular, the reflected radiation generated by the trace or by the melt pool during processing covers the optical path in reverse. The dichroic mirror selects some frequencies, letting them through, and sends them towards a monitoring element or system, for instance.

The optical unit or device located in the second boxlike body 12d comprises a set of optical components designed to deflect and/or manipulate an incident laser beam L. For instance, the optical device 12*d* may comprise one or more orienting mirrors M1, M2, as discussed in what follows in relation to FIG. 6, which are movable via respective galvanometric actuators A1, A2 (represented in an altogether schematic way in FIG. 6) configured for rotating the two mirrors M1, M2—and thus the laser beam L deflected thereby—along mutually perpendicular axes of rotation.

Some embodiments may comprise, as optical components used in the optical device 12*d*, also ones of multiple and/or different types, such as prisms, lenses, diffraction gratings, beam-splitters, polarizers, expanders, and other components per se known but combined in such a way as to facilitate control of the properties of the laser beam according to the method discussed herein.

Moreover visible in the view of FIG. 3 is the frame 30 that carries the nozzles 34 and the pressurized conduit 12*e* within which the laser beam L passes.

According to a further optional embodiment, the above nozzles 34 are movable, namely, adjustable, with respect to the injection axis I so as to be able to vary in time the relative position of their axes U. The frame 30, as mentioned in the foregoing, is optionally moved according to a rotation about a vertical axis of its own, parallel to the axis Z and passing through the centre of the perimeter defined by the nozzles 34, via an actuator (not visible in the figures). In general, the axis of the frame coincides with the normal axis of incidence I. In the embodiment provided by way of example, the pressurized conduit 12*e* is secured with respect to the frame 30, and the conduit 12*e* and the frame 30 rotate fixedly with respect to the top portion 12*a*, which, instead, is secured with respect to the support 11*d*; namely, it is movable only along the first plurality of axes of movement X, Y, Z of the conveying system 11.

In an alternative embodiment, the pressurized conduit 12*e* is secured with respect to the top part 12*a*, whereas the frame 30 is, instead, associated to the bottom end of the conduit 12*e* in a way rotatable about the longitudinal axis of the conduit 12*e*, which corresponds to the main vertical axis of inertia of the frame, if understood as disk or ring. Actuation means maybe arranged, in this case, within the conduit 12*e* for rotating the frame 30.

Figure 4:
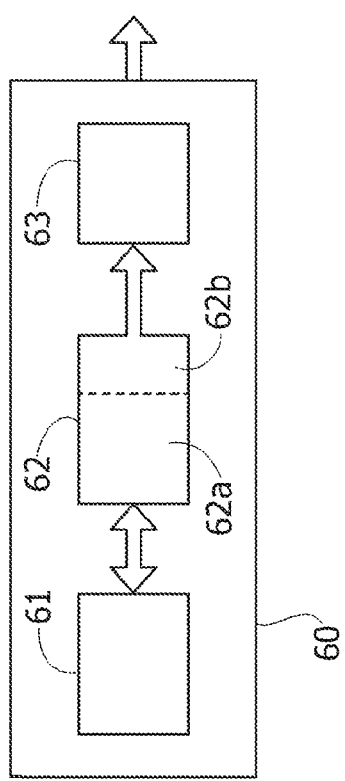
FIG. 4 is a diagram of a control architecture of a system according to the solution as exemplified herein.

Represented in FIG. 4 is a principle diagram of the architecture of a numeric control unit 60 for managing control of the actuators, namely, the motors of the conveying structure 11, that move the axes X, Y, Z of the head 12 and that move the slides 31*u*, 31*v*, and hence the axes of the optical device 12*d*, namely, the galvanometric actuators of the axes of rotation α and β. The unit 60 comprises two personal computers 61 and 62. The personal computer 61 operates as user interface for sending instructions and commands to the second personal computer 62, which preferably comprises an associated operating system 62*a* associated to extensions of a real-time type 62*b* for management of the machine. The operating system maybe, for example, of a Linux, WinCE type, or may be obtained via proprietary solutions. The personal computer 62 hence supplies the trajectories to be followed to a servocontrol card 63 of a DSP PCI type for controlling the actuators.

Implemented in the personal computer 62 and in the servocontrol card 63 are procedures for managing the system, which is described in further detail in what follows.

The numeric control unit 60, according to procedures per se known in the prior art, generates a sequence of instructions P, corresponding to a so-called part program for a virtual machine with given specifications of acceleration and velocity. Such a sequence of instructions P comes from the personal computer 61 and is originated by a purposely-designed program for off-line setting of the trajectories and movements of the machine. Applied thereto is an interpolation function, which, based on the sequence of instructions P, generates a trajectory of the machine tool 10. This trajectory of the machine tool 10 corresponds to the kinematic coordinates that describe, in time, the motion of a point of the machine tool 10, for example a joint or a terminal, or tool centre point (TCP). This interpolation operates in response to a preparation code, or G-Code, sent within the sequence of instructions P. The interpolation operation is implemented via software within the personal computer 62.

It is moreover noted that, in the DED additive-manufacturing 10 machine described, the unit 60 is configured for sending further commands regarding regulation, for example, of the rate of the powder jets and the flow rate of the process gas. These commands may be associated to the sequence of instructions P in order to occur in given points and at given instants defined by the trajectory of the machine tool, as well as in order to drive the actuators of the galvanometric mirrors A1, A2, as discussed in what follows.

According to a main aspect of the solution described herein, the optical device in the boxlike body 12*d* is driven by the control unit 60 in such a way as to impart on the laser beam L, during the processing cycle, a dynamic movement, for example a dynamic variation with frequency w of the angle with which the laser beam emitted by the head impinges upon the region PD of the working surface 110.

In various embodiments, there may be imparted on the laser beam emitted by the head a dynamic oscillation, namely, a continuous or even intermittent cyclic oscillation, variable in time with a pre-set frequency, which causes a focusing spot LS to follow a pre-set pattern cyclically and periodically, for example a circular pattern.

In what follows, for simplicity, principles of the solution are discussed with reference to the movement of dynamic oscillation provided above by way of example, it remaining on the other hand understood that this example is in no way limiting. In various embodiments, in fact, the dynamic movement imparted on the laser beam comprises movements of translation of the laser beam, rotation of the laser beam, or any other type of movement of the laser beam, and/or combinations of movements.

As mentioned for simplicity in what follows, reference is made mainly to a head 12 operating with nozzles 34 that can assume a position with respect to an injection axis that remains unvaried in time; however, it is understood that a solution as discussed herein can be applied also to the case where the nozzles are moved, as discussed in the foregoing.

Figure 5:
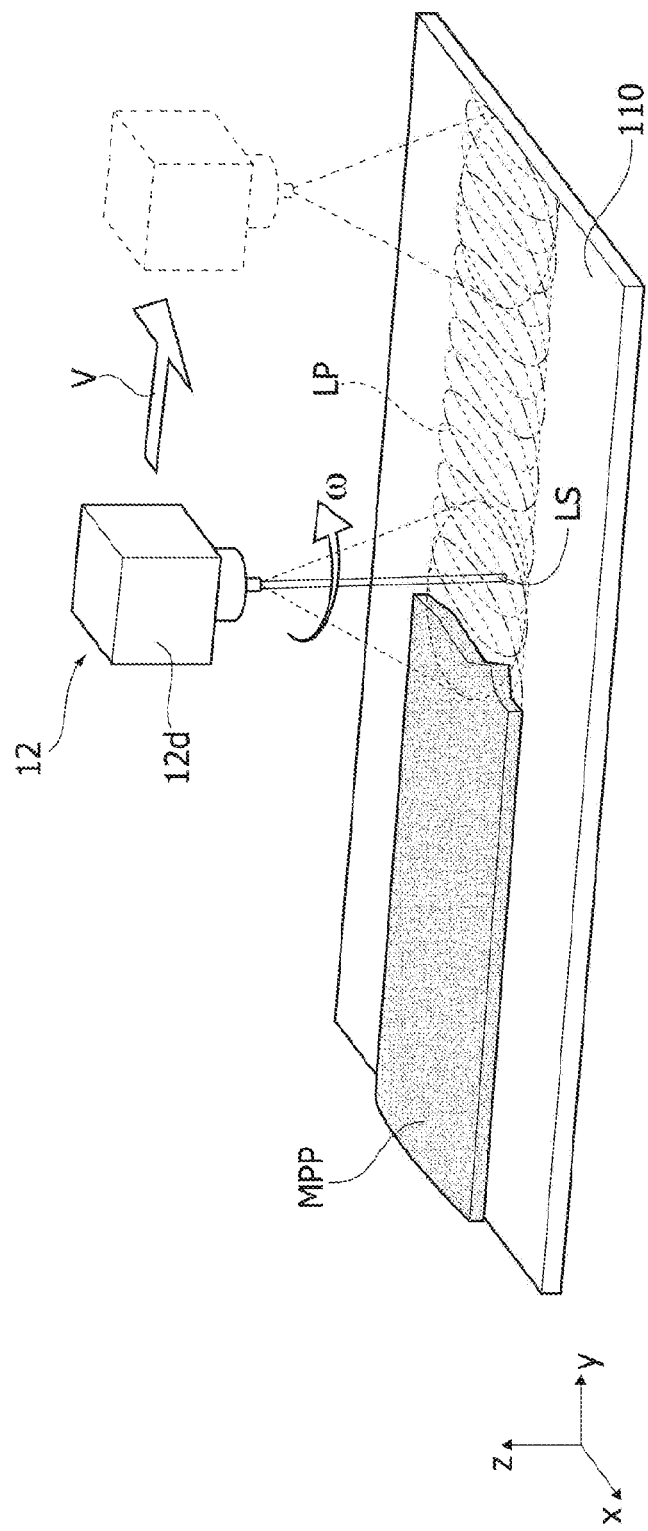
FIG. 5 illustrates in a simplified way the operating principle underlying the present solution.

FIG. 5 exemplifies principles underlying a solution discussed herein.

As has been mentioned, the head 12 can be translated, for example with a velocity V, in three-dimensional space, for example according to the axes X, Y, Z, so as to deposit the powders via the nozzles 34 and, simultaneously, treat them thermally via a laser beam controlled via the scanner module 12*d*. Both the laser L and the nozzles 34 are driven according to instructions received from the control unit 60.

As a consequence of the above translation, a powder-deposition point PD is also translated rigidly with respect to translation of the head 12 at the velocity V so as to create a strip of powders generated by the sequence of the deposition points PD that translate as one with the head 12.

Likewise, a laser spot LS simultaneously used for treating the powders deposited in the powder trace moves along a light path LP, for example shaped like an epicycloid, represented with dashed lines in FIG. 5.

As a result of the movement imparted on the laser beam during translation of the head 12, the resulting "illuminated" portion transmits to the powders a power having a distribution equal to the one resulting from translation of a shaped spot or "apparent spot" of a size corresponding to the amplitude of the oscillation imparted on the laser beam.

It is noted that what has been discussed in the foregoing applies both in the case of movable nozzles 34 and in the case of secured nozzles 34. FIG. 6 represents a diagram, provided by way of example, of movable optics that can be used; for example, the scanner module 12d of the head 12 is visible.

For instance, the optical device 12d may comprise an optical path for the laser L, which includes:

a first movable mirror M1, having at least one reflecting surface set along the optical path of the laser beam L coming from the stationary mirror described above, set downstream of the adaptive collimator 12c; the mirror M1 is configured for being orientable, via an actuator A1 coupled thereto, along a first axis, for example a horizontal axis X; and a second movable mirror M2, which has at least one reflecting surface set along the optical path of the laser beam L reflected by the mirror M1, configured for being orientable via an actuator A2 coupled thereto along a second axis orthogonal (namely, set at 90°) to the first axis of orientability of the first movable mirror M1; for example, the mirror M2 may be adjustable along the vertical axis Z.

The actuators A1, A2 may be galvanometric actuators, which are per se known.

The second mirror M2 may moreover be configured for supplying, at output, the laser beam L so that it is going to be directed towards the working surface 110.

When the laser beam L encounters the first movable mirror M1, it is reflected with a certain angle α with respect to an axis perpendicular to a reflecting surface of the mirror. In the same way, when the laser beam L reflected by the first movable mirror M1 encounters the second movable mirror M2, it is reflected with a further angle β defined with respect to a further axis perpendicular to a reflecting surface of the second mirror M2.

By varying in time the values of these angles of deflection in a coordinated way, it is thus possible to impart such a dynamic oscillation.

In some embodiments, it is possible to drive the actuators of the respective mirrors A1, A2 in a way independent of, or co-ordinated with, one another by sending corresponding instructions, for example via the control module 60.

By repeating with a certain period, for example with a period that is the inverse of the dynamic-oscillation frequency ω, a given sequence of movements of orientation of the mirrors M1, M2 via respective actuators A1, A2, it is possible to obtain a certain shape or pattern, or, conversely, starting from a certain shape that is to be obtained it is possible to drive the actuators accordingly.

It is noted that in what follows for simplicity there is discussed the case where the dynamic oscillation is imparted with two mirrors, it remaining on the other hand understood that any number of mirrors, for example a number of mirrors equal to or greater than two, could be used in some embodiments.

Likewise, in what follows for simplicity there is discussed the case where there are two actuators, it remaining on the other hand understood that any number of actuators, for example an even number, could be used in some embodiments.

FIG. 8 illustrates some shapes or patterns provided by way of example that it is possible to obtain with the movable mirrors M1, M2 driven by the actuators A1, A2.

As exemplified in FIG. 8, for instance:

as represented in portion A), it is possible to obtain a circular pattern I, which, once translated with velocity V, forms an epicycloidal light path $LP_A$; such a circular pattern can be obtained, for example, by moving the first mirror according to a sine function and the second mirror according to a cosine function (or vice versa);

as represented in portion B), it is possible to obtain an ellipsoidal pattern $L_B$, which, once translated with velocity V, forms a spiralled light path LSB having the shape of a translated ellipse;

as represented in portion C), it is possible to obtain a linear pattern $L_C$, which, once translated with velocity V, forms a V-shaped light path $LS_C$; such a linear pattern may be obtained, for example, by moving just one of the two mirrors, for example the second one M2, so that it may assume all the positions between two maximum angles, between which the mirror can be oriented; and as represented in portion D), it is possible to obtain a pattern shaped like a FIG. 8 $LP_C$, which, once translated with velocity V, forms a double spiral.

It is noted that the examples discussed in the foregoing, as such, do not constitute any limitation on the patterns that can be obtained by imparting the dynamic oscillation on the laser beam L, it remaining on the other hand understood that other patterns could be obtained, in addition to the ones exemplified herein.

Thanks to the circular dynamic oscillation I imparted via the mirrors M1, M2 and the respective actuators A1, A2 in the scanner module 12d located in the head 12, as discussed in the foregoing, notwithstanding the property of the powders to deposit according to a bell-shaped distribution, the resulting trace MPP is substantially flat; namely, it has a shape that is more flattened at the centre as compared to what can be obtained with known solutions and that presents a negligible difference of level between the point of maximum and the point of minimum of the thickness of the trace, notwithstanding the tendency of the powders to accumulate to a higher level in the central area of the trace, the depth h of the trace MPP being also consequently decreased with respect to the depth that it would have following upon such an accumulation of powders.

Figure 7:
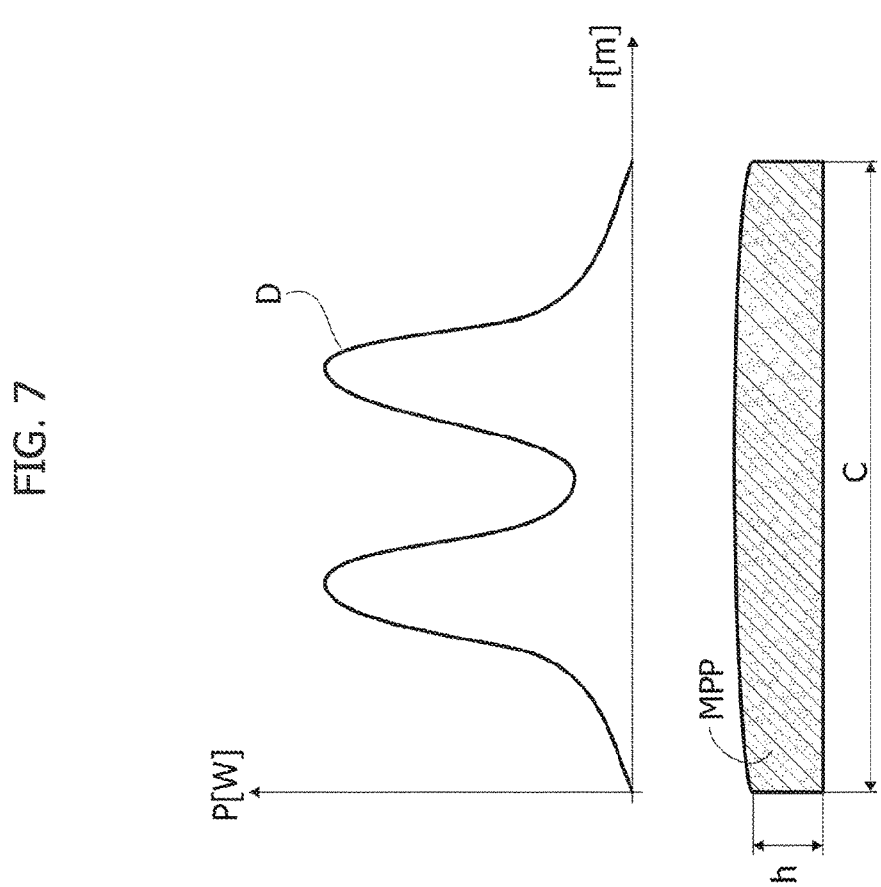

As exemplified in FIG. 7, the laser power transmitted to the powders, for example with a pattern of a circular type I, presents a power distribution designated by D.

Thanks to the distribution D of the power transmitted, obtained with the method discussed in the foregoing, the height h of the cross section of the trace MPP does not vary significantly as a function of the distance from a centre in a transverse direction in so far as the cross section of the trace MPP in a direction transverse to the velocity V of translation presents a quasi-uniform thickness of a value h both at the centre and at the edges, where the edges are set apart from one another by a distance c.

The above width is substantially equal to the maximum amplitude of the distribution D of transmitted power. Consequently, thanks to the resulting power distribution D it is possible to obtain a relatively wide c and relatively thin h metal trace MPP, which, on the one hand, ensures the possibility of obtaining a given product in a relatively short time and, on the other, facilitates manufacture of the product by overlaying layers of material having a small depth h, namely, manufacture of the product with a high degree of resolution.

FIG. 9 is a diagram provided by way of example of operations of one or more embodiments of a method 1000 for additive manufacturing as discussed herein.

For instance, the method 1000 may comprise:

1010: providing an additive-manufacturing head 12 configured, for example via the nozzles 34, both for directing one or more jets of powders PJ, in particular metal powders, onto a region of a working surface 110, and for directing simultaneously, for example via the optics M1, M2 in the scanner module 12d, a laser beam L onto such a region, in particular onto the trace of the powders deposited, to form a focusing spot LS of the laser beam L on the region; and

1012: during direction of such powder jets PJ and of such a laser beam L, LS, simultaneously translating the additive-manufacturing head 12 in a direction transverse to the direction of the laser beam L, for example with a velocity V of translation along an axis X or Y, so as to give rise to a light path LP that carries out a thermal treatment on the powders, thus forming a solid trace MPP via melting and subsequent solidification of the powders, in particular as a result of the power transmitted to such powders by such a laser focusing spot L of in the light path LP; and

1014: during movement of the additive-manufacturing head 12 in the transverse direction, imparting a dynamic oscillation on the laser beam L emitted by the head 12, this oscillation, which for example has a frequency ω, being configured in such a way as to obtain a width c of the trace that is independent of the size of the focusing spot of the laser beam L, and in such a way that the distribution of the power transmitted by the laser beam to the trace (so that the powders intercepted by the laser beam are going to solidify, forming a sequence of melt pools and consequently the trace itself) varies along the direction of the width, for example according to a power distribution D, with a profile having two valleys and one central peak.

Without prejudice to the underlying principles, the details and the embodiments may vary, even appreciably, with respect to what has been described herein, purely by way of example, without thereby departing from the sphere of protection, as this is defined by the annexed claims.

The invention claimed is:

1. A method for additive manufacturing,
wherein an additive-manufacturing head directs one or more jets of powders (PJ), wherein the powders comprise metal powders, onto a region (PD) of a working surface,
wherein said head simultaneously directs a laser beam (L) onto said region (PD), to form a focusing spot (LS) of the laser beam (L) on said region (PD), and
wherein, during direction of said one or more jets of powders (PJ) and of said laser beam (L) onto said region (PD), said additive-manufacturing head is simultaneously translated in a direction transverse to the direction of the laser beam (L) so as to give rise to a trace (MPP) obtained by melting of said powders as a result of power (D) transmitted to said powders (PJ) by said focusing spot (LS),
wherein, during translation of the additive-manufacturing head in said transverse direction, a dynamic movement with respect to the head is imparted on the laser beam (L) emitted by the head, said dynamic movement being configured to obtain a width (c) of said trace (MPP) that is independent of the size of the focusing spot (LS) of the laser beam (L) and is equivalent to the one that would be produced by simple translation of an apparent spot having a width corresponding to the width (c) of the trace (MPP),
said dynamic movement being moreover configured in such a way that the distribution of the power (D) transmitted by the laser beam (L) to the trace (MPP) varies along the direction of the width (c) of the trace (MPP), wherein the movement imparted on the laser beam (L) is such that a central area of the trace receives from the laser beam (L) a lower power with respect to lateral areas of the trace so as to obtain the trace (MPP) having a pre-set and controlled depth (h) that is smaller than the width (c), notwithstanding the tendency of the powders to accumulate in the central area of the trace (MP, MP').

2. The method according to claim 1, wherein said dynamic movement imparted on the laser beam (L) is a cyclic movement such that in each cycle the focusing spot (LS) of the laser beam (L) describes a pre-set pattern (LP).

3. The method according to claim 2, wherein said pre-set pattern is selected from among a plurality of patterns consisting of: a circular pattern ($L_A$, $LP_A$), an elliptical pattern ($L_B$, $LP_B$), a linear pattern ($L_C$, $LP_C$), and a FIG. 8 pattern ($L_D$, $LP_D$).

4. The method according to claim 1, wherein said dynamic movement imparted on the laser beam (L) is a movement of dynamic oscillation (ω).

5. The method according to claim 4, wherein said dynamic movement imparted on the laser beam (L) is a cyclic movement of oscillation (ω) substantially corresponding to a movement of precession, wherein in each cycle of said movement of precession the focusing spot (LS) of the laser beam (L) describes a pre-set pattern (LP).

6. The method according to claim 1, wherein a velocity (V) of translation of the additive-manufacturing head (12) and/or a velocity (ω) with which the focusing spot (LS) of the laser beam (L) describes a pattern (LP) at each cycle of oscillation of the laser beam (L) are predetermined to obtain a desired distribution of the power (D) transmitted by the laser beam (L) to the trace (MPP) in the direction of the width (c) of the trace (MPP).

7. The method according to claim 6, wherein said pattern (LP), said velocity of translation (V) of the head, and/or said velocity (ω) with which the focusing spot (LS) of the laser beam (L) describes said pattern (LP) at each cycle of oscillation of the laser beam (L) are chosen to give rise to a desired profile of the power (D) transmitted by the laser beam (L) with respect to the direction of the width (c) of the trace (MPP).

8. An additive-manufacturing system, comprising:
an additive-manufacturing head including one or more nozzles (34) for directing one or more jets of metal powders (PJ) onto a region (PD) of a working surface, and a laser-beam device for directing a laser beam (L) onto said region (PD) simultaneously with directing of said one or more jets of metal powders (PJ), to form a laser-beam focusing spot (LS) on said region (PD),
and wherein said additive-manufacturing head is configured for being translated, in a direction transverse to the direction of emission of the laser beam (L), during direction of said one or more jets of metal powders (PJ) and of said laser beam (L), so as to give rise to a trace (MPP) obtained by melting of said metal powders as a result of power (D) transmitted to said metal powders (PJ) by said laser-beam focusing spot (LS), said head further comprising:

the laser-beam device for orienting the emitted laser beam; and at least one electronic controller for controlling the movement of translation of the head and for governing said laser-beam device, said system wherein the at least one electronic controller is configured for governing said laser-beam device in order to impart on the laser beam (L) emitted by the head, during movement of the head in said transverse direction, a dynamic movement with respect to the head, said imparted dynamic movement being configured to obtain a width (c) of said trace that is independent of the size of the focusing spot (LS) of the laser beam (L) and is equivalent to the one that would be produced by simple translation of an apparent spot having a width corresponding to the width (c) of the trace (MPP), said imparted dynamic movement being moreover configured in such a way that the distribution of the power (D) transmitted by the laser beam (L) to the trace (MPP) varies in the direction of the width (c) of the trace (MPP), wherein the movement imparted on the laser beam (L) is such that a central area of the trace receives from the laser beam (L) a lower power with respect to lateral areas of the trace so as to obtain the trace (MPP) having a pre-set and controlled depth (h) that is smaller than the width (c), notwithstanding the tendency of the metal powders to accumulate in the central area of the trace (MP, MP').

9. The system according to claim 8, wherein said dynamic movement imparted on the laser beam (L) is a dynamic oscillation ($\omega$) configured to obtain a width (c) of the metal trace that is independent of the size of the focusing spot (LS) of the laser beam (L) and is equivalent to the one that would be produced by an apparent spot having a width corresponding to the width (c) of the trace (MPP), and in such a way that the distribution of the power (D) transmitted by the laser beam (L) to the trace (MPP) varies along the direction of the width (c) of the trace.

10. The system according to claim 8, wherein said laser-beam device comprises a pair of mirrors (M1, M2) arranged in sequence along the path of the laser beam (L) and mounted oscillating about respective mutually orthogonal axes ($\alpha$, $\beta$), and two actuator devices (A1, A2), each for governing a movement of oscillation of a respective mirror (M1, M2).

11. The system according to claim 8, wherein said one or more nozzles can be oriented via respective actuators.

12. The system according to claim 8, wherein said laser-beam device comprises a plurality of optical components.

13. The system according to claim 12, wherein the plurality of optical components includes rotating prisms and/or adaptive collimators.

\* \* \* \* \*